United States Patent [19]

Fuschetto

[11] Patent Number: 5,025,183
[45] Date of Patent: Jun. 18, 1991

[54] ELECTROMAGNETIC ACTUATOR DRIVER APPARATUS WITH PIVOT AXIS

[75] Inventor: Anthony N. Fuschetto, W. Redding, Conn.

[73] Assignee: The United States of America as represented by the Secretary of the Air Force, Washington, D.C.

[21] Appl. No.: 353,121

[22] Filed: May 17, 1989

[51] Int. Cl.<sup>5</sup> ............... H02K 41/02; B23Q 1/00; G02B 26/00
[52] U.S. Cl. ................... 310/20; 269/238; 310/13; 335/128
[58] Field of Search ............ 74/99 R, 103; 248/479; 254/124; 269/238; 310/12, 13, 20, 23, 26, 37, 328; 350/611, 637

[56] References Cited

U.S. PATENT DOCUMENTS

| | | | |
|---|---|---|---|
| 3,007,063 | 10/1961 | Harris | 310/330 |
| 4,136,293 | 1/1979 | Patel | 310/13 |
| 4,438,984 | 3/1984 | Leppälä | 269/238 |
| 4,603,270 | 7/1986 | Van Davelaar | 310/13 |
| 4,620,253 | 10/1986 | Garwin et al. | 310/13 |
| 4,655,560 | 4/1987 | Glomb, Jr. | 350/611 |
| 4,655,563 | 4/1987 | Plante et al. | 350/611 |
| 4,709,178 | 11/1987 | Burr | 310/80 |
| 4,717,873 | 1/1988 | Carr, Jr. et al. | 324/207 |

Primary Examiner—Peter S. Wong
Assistant Examiner—D. L. Rebsch
Attorney, Agent, or Firm—William Stepanishen; Donald J. Singer

[57] ABSTRACT

An electromagnetic actuator driver apparatus having a bobbin with an electrical coil wound around the central portion thereof and positioned within a permanent magnetic generated flux field structure. A drive arm is engaged by bobbin fingers at the input end of the drive arm to deflect the output end of the drive arm by a predetermined amount in response to a control signal which is applied to the electrical coil.

5 Claims, 1 Drawing Sheet

ELECTROMAGNETIC ACTUATOR DRIVER APPARATUS WITH PIVOT AXIS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to actuator apparatus, and in particular to an electromagnetic actuator driver apparatus.

The state of the art of control actuator apparatus is well represented and alleviated to some degree by the prior art apparatus and approaches which are contained in the following U.S. Patents:

U.S. Pat. No. 4,655,560 issued to Glomb, Jr. on Apr. 7, 1987;

U.S. Pat. No. 4,655,563 issued to Plante et al on Apr. 7, 1987; and

U.S. Pat. No. 4,717,873 issued to Carr, Jr. et al on Jan. 5, 1988.

The Glomb, Jr. patent describes a demagnetization compensated deformable magnetostrictive mirror comprising an array of magnetostrictive actuators that are positioned between a continuous low magnetic reluctance yoke. A faceplate having a reflective surface and a substrate are both fabricated to receive the magnetic yoke's outer surface and are affixed thereto to be approximately perpendicular to the mirror's deformation axis.

The Plante et al patent discusses a lightweight deformable mirror suitable for space applications in which a plurality of electrically-operated electrodistortive actuators may be used to selectively deform the mirror's reflecting surface. The actuators are sandwiched between a pair of thin sheets of glass with the surface of one sheet finished to form the mirrors reflecting surface.

The Carr Jr. et al patent discloses a magnetic displacement transducer system having a magnet that is movable in a tube whose interior is exposed to a fluid and having at least one magnetometer outside the tube.

In the prior art, mirrors with deformable surfaces are well known in the art, and have found extensive use in advanced high energy laser systems. The coherent light from a laser has surfaces of instant phase which are distorted while propagating through the atmosphere. In addition to reflecting the beam, the deformable mirrors provide a correction for this environmentally generated wavefront distortion. Deformable mirrors are characterized by a reflective surface behind which is positioned an array of externally controllable piezoelectric or magnetostrictive actuators. Upon receipt of an external signal, the actuators will exert a force upon the reflective surface and deform the originally planar surface into a surface whose geometry will provide the reflected wave with coherent phase.

The present invention is directed to an electromagnetic actuator driver apparatus which advances the art of deformable mirrors and which overcomes the problems and limitation of such prior art devices.

SUMMARY OF THE INVENTION

The present invention utilizes an electromagnetic actuator driver apparatus which comprises a voice coil that is energized in magnetic flux field that is generated by a permanent magnet. The magnetic circuit which generates the magnetic field is a very efficient design in terms of the flux density that is generated in the air gap in comparison to the circuit size.

It is one object of the present invention, therefore, to provide an improved electromagnetic actuator driver apparatus.

It is another object of the present invention to provide an improved electromagnetic actuator driver apparatus that utilizes an electromagnetic driver.

It is yet another object of the present invention to provide an improved electromagnetic actuator driver apparatus wherein a voil coil is operated in a permanent magnet generated flux field.

It is a further object of the present invention to provide an improved electromagnetic actuator driver apparatus wherein the magnetic circuit is a very efficient design in terms of the flux density generated versus the circuit size.

It is still another object of the invention to provide an improved electromagnetic actuator driver apparatus which is economical to produce and utilizes conventional, currently available components that lend themselves to standard mass production manufacturing techniques.

These and other advantages, objects and features of the invention will become more apparent after considering the following description taken in conjunction with the illustrative embodiment in the accompanying drawings.

DETAILED DESCRIPTION OF THE PREFERRED EMBODIMENT

Figure 1:
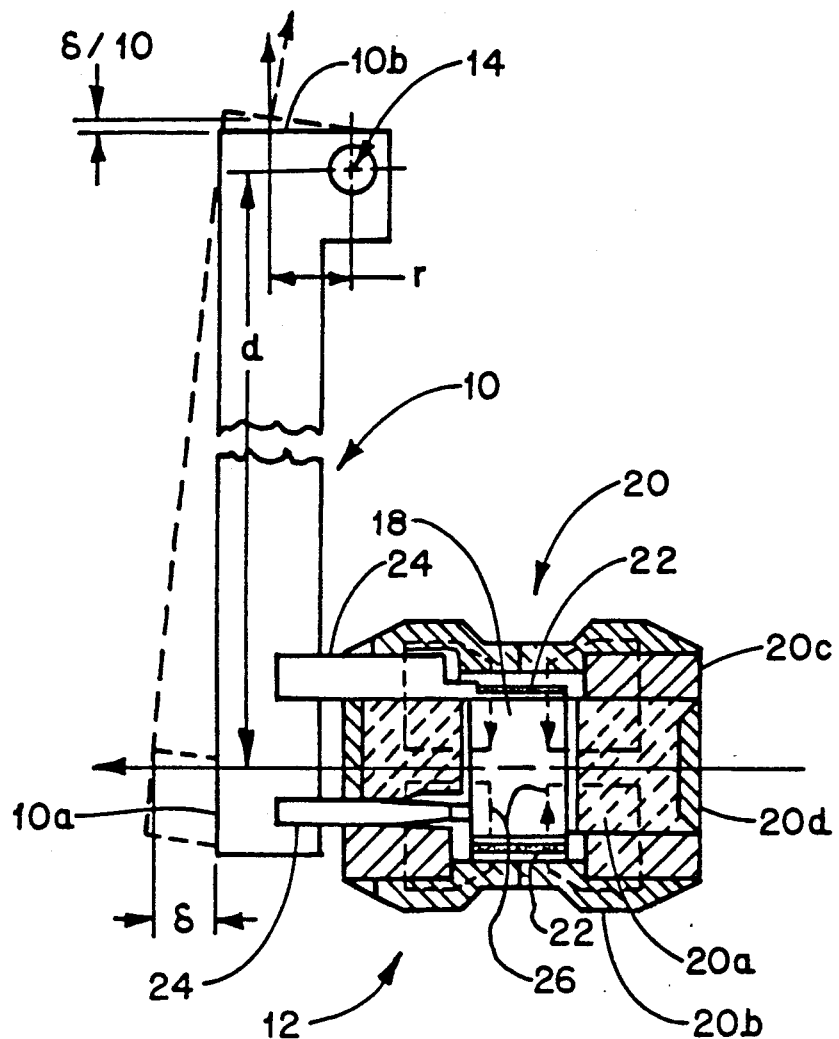
FIG. 1 is a plan view of the electromagnetic actuator driver apparatus according to the present invention.

Referring now to FIG. 1, there is shown an electromagnetic actuator driver apparatus comprising a drive arm 10 and an electromagnetic driver unit 12. The drive arm 10 has a drive arm length d and pivots about the flexural pivot axis 14. The drive arm length d may be adjusted as necessary to meet any specific application. The drive arm 10 which pivots about pivot axis 14 is shown by dash lines in its deflected position 16. When the drive arm 10 is deflected at its input end 10a by an amount δ its output end 10b which is in close proximity to the pivot axis 14 will be deflected by the amount of δ/10 in this particular example. However, it should be well recognized that the deflection relationship between the input end 10a and the output end 10b will be dependent upon the drive arm length d and the distance r which is between the pivot axis point 14 and the center of the drive arm 10 at the output end 10b. The deflection amount of the output end 10b (in this example δ/10) is measured from the centerline of the output end 10b of the drive arm 10 when the drive arm 10 is displaced by the electromagnetic driver unit 12 and pivots about the flexural pivot axis 14.

The electromagnetic driver unit 12 comprises an electrically actuated bobbin unit 18 and a magnetic flux generating structure 20. The electrically actuated bobbin unit 18 includes a predetermined number of wire turns of electrically conductive material wrapped around the central portion of the bobbin unit 18 to form an electrical coil. The central portion of the bobbin unit 18 comprises a hollow cylinder which may be fabricated from a plastic material or a non-continuous metal. A non-continuous metal cylinder is defined as a cylinder with a slot or air gap in its cylinder wall parallel to the centerline of the cylinder. The slot or air gap is necessary to prevent a continuous path for any unwanted currents in the event a metallic bobbin is utilized. The bobbin unit 18 further includes a number of bobbin fingers 24 which serve to support the bobbin unit within the air gap space within the magnetic flux generating structure 20 and, at one end to engage the drive arm 10. The bobbin unit 18 is electrically actuated to displace the drive arm 10 by the displacement amount $\delta$ or anywhere therebetween the rest position of the drive arm 10.

The magnetic flux generating structure 20 comprises an inner pole 20a, an outer pole 20b, a number of radially poled permanent magnets 20c and axially whole bias end magnets 20d. It should be noted that the magnetic flux generating structure 20 is a unit that is split into two identical halves about a line through the center of the structure, to permit the easy assembly of the bobbin unit 18 into the structure 20 to fabricate the electromagnetic driver. The inner pole 20a comprises a solid rod of a magnetic material which passes through the central portion of the bobbin 18 and extends into each end of the magnetic flux generating structure 20. The outer pole 20b comprises a substantially cylindrical structure which is fabricated from a magnetic material. The magnetic flux which is generated by the magnetic flux generator structure 20 follows the paths 26 shown by the dashed arrows which intersect the bobbin unit in the air gap region of the structure 20.

Figure 2:
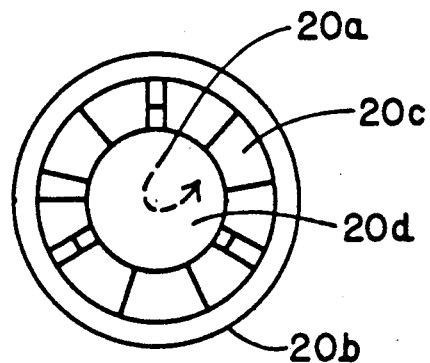
FIG. 2 is an end view of the electromagnetic driver.

Turning now to FIG. 2, there is shown an end view of the magnetic flux generating structure 20. The flux generating structure 20 comprises an inner pole 20a about which there is disposed a number of radially poled permanent magnets 20c. There is disposed about the radially poled permanent magnets 20c an outer pole 20b. An axially poled bias end magnet 20d is provided to cap the ends of the magnetic flux generating structure 20.

The electromagnetic actuator driver apparatus comprises a permanent magnet voice coil type linear motor in which the moving coil of the motor drives the input end of a lever arm which is supported on a pair of flexure pivot bearings. At the output end of the arm is a push rod linkage that is attached to an invar pad at the back of the mirror.

The actuator driver is the major component of the electromagnetic actuator driver. The driver is a voice coil operating in a permanent magnet generated flux field structure. A double ended magnet design with central air gap provides for a very efficient magnetic circuit structure versus size. High energy product ($23 \times 10^6$ Gauss-oersted) samarium cobalt is used as the magnet material. For high saturation induction, vanadium permadur material is used for the inner and outer pole pieces. The inner and outer pole units have been tailored in shape for a lightweight design with operation close to saturation. The bias magnets at the ends of the magnetic flux generating structure 20 are used to reduce the leakage flux and to drive the flux field towards the air gap. The design goal was to achieve 7000 gauss in the air gap. The operation of the electromagnetic driver unit 20 is as follows: a flux field is generated in the air gap by the radially poled magnets and when there is a current applied to the coil 22, a force (F) is generated along its axis, $F=BLI$ where:

B is flux density across the gap,
L is length of wire on coil, and
I is current through the coil.

The figure control actuators apparatus, in the present example, was designed for a 10 to 1 output to input mechanical lever ratio with the following force and displacement capability: (Note: this ratio is flexible and can be made to suit any design requirement.)

|  | INPUT | OUTPUT |
|---|---|---|
| Peak Force | 2 lbs. | 20 lbs. |
| Peak Displacement | 50 mils | 5 mils |

The actuator apparatus driver arm may comprise a lightweight aluminum tapered I-beam section. On the prototype actuators it was learned that it is important to minimize the weight of the drive arm so that its reflected inertia referred to the output end does not add appreciable mass to the faceplate which will significantly lower the mirror natural frequency. In order to minimize the reflected drive arm mass on the baseline mirror, the following changes will be made from what exists on the breadboard:

Drive arm material may be beryllium rather than aluminum,

The bobbin coil material may be aluminum rather than copper, and

The output to input ratio may be 8 to 1.

Although the invention has been described with reference to a particular embodiment, it will be understood to those skilled in the art that the invention is capable of a variety of alternative embodiments within the spirit and scope of the appended claims.

What is claimed is:

1. A slidable electromagnetic actuator driver apparatus comprising in combination:

a drive arm having an input end and an output end, said drive arm operatively connected to a pivot axis for rotation thereabout, said drive arm having a predetermined length, said pivot axis being spaced a predetermined distance from the centerline of said drive arm, and means for electrromagnetically driving said drive arm from a rest position to a displaced position, said electromagnetic drive means being responsive to a control signal to slidably displace said drive arm a predetermined amount, said electromagnetic drive means comprises an electrically actuated bobbin unit including a predetermined number of bobbin fingers extending in opposite directions away from the central portion of said bobbin unit, said central portion of said bobbin unit including means for receiving said control signal, and a magnetic flux generating means operatively engaged with said bobbin unit, said magnetic flux generating means generating a magnetic flux which operatively engages said central portion of said bobbin unit, said bobbin unit in response to said control signal and said magnetic flux operating to displace said drive arm, said magnetic flux generating means comprises:

an inner pole, said inner pole comprising a magnetic material, said inner pole having a substantially solid cylinder structure, an outer pole having a substantially cylindrical shape, said outer pole having a first and second member, said first and second members being operatively engaged to form said outer pole, said outer pole surrounding said inner pole completely, said outer pole substantially enclosing said bobbin unit therein, first and second permanent magnet means, said first and second permanent magnet means respectively having a cylindrical shape, said first and second permanent magnetic means operatively positioned respectively in said first and second member, said first and second permanent magnet means operatively positioned to respectively surround said inner pole, said outer pole surrounding said permanent magnet means, and first and second bias end magnets operatively aligned with said inner pole inside the outer end of said permanent magnet means.

2. An electromagnetic actuator driver apparatus as described in claim 1 wherein said permanent magnet means comprise radially poled permanent magnets.

3. An electromagnetic actuator driver apparatus as described in claim 1 said bias end magnet means comprises axially poled magnets.

4. An electromagnetic actuator driver apparatus as described in claim 1, wherein said receiving means comprises a predetermined number of turns of wire around said central portion of said bobbin unit to form an electrical coil.

5. An electromagnetic actuator driver apparatus as described in claim 1 wherein said inner pole is operatively positioned within said central portion of said bobbin unit.

* * * * *